March 25, 1924.

A. B. McBRIDE

MOVABLE PARTITION

Filed Nov. 21, 1922

1,487,789

Inventor:
Andrew B. McBride
By Percy H. Moore
Attorney

Patented Mar. 25, 1924.

1,487,789

UNITED STATES PATENT OFFICE.

ANDREW B. McBRIDE, OF CARTHAGE, MISSOURI.

MOVABLE PARTITION.

Application filed November 21, 1922. Serial No. 602,481.

*To all whom it may concern:*

Be it known that I, ANDREW B. MCBRIDE, a citizen of the United States of America, residing at Carthage, in the county of Jasper and State of Missouri, have invented certain new and useful Improvements in Movable Partitions, of which the following is a specification.

My invention relates to movable partitions and has for its object to provide a partition which can be readily moved back against the wall of the building, cage or enclosure in which it is used.

Other and further objects and advantages of my invention will be in part described and in part obvious as this specification is proceeded with.

In the accompanying drawings forming part of the specification:

Figure 1:
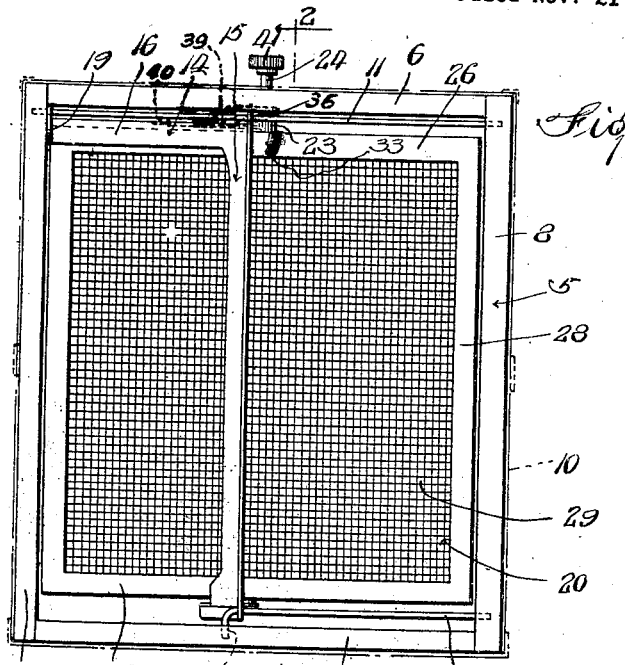
Figure 1 is a side elevation of the partition.
Figure 2:
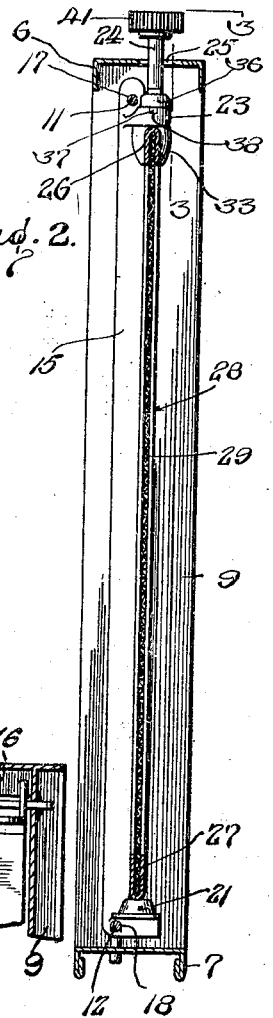
Figure 2 is a section on the line 2—2 of Figure 1.
Figure 3:
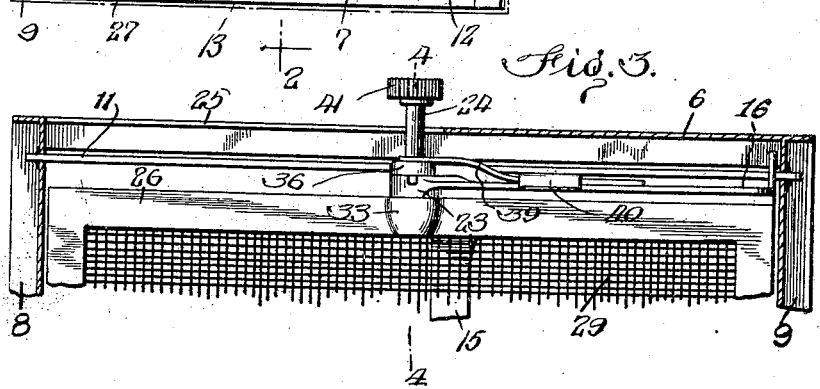
Figure 3 is a section on the line 3—3 of Figure 2.
Figure 4:
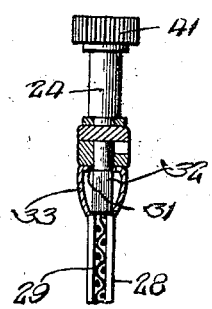
Figure 4 is a section on the line 4—4 of Figure 3.

Referring more particularly to the drawing, 5, denotes a rectangular frame comprising top and bottom bars 6 and 7 respectively and side bars 8 and 9. This frame is suitably positioned (preferably detachably) in an inclosure which it is desired to partition off, in the present instance the inclosure represented is a bird cage.

A rod 11, extends between the side bars 8 and 9 at the upper ends thereof slightly beneath the top bar 6, and a rod 12, extends from one of the side bars 8, to a point midway of the bottom bar 7, where the end of the rod is bent downwardly through the bottom bar as at 13.

Mounted on the rods 11 and 12 is a sliding bracket 14, comprising an upright 15, having an arm 16, disposed at right angles thereto and extending parallel with the top bar 6. The upright 15, is formed with apertures 17, and 18 at opposite ends through which the respective rods 11 and 12 loosely extend, the bracket 14, being freely slidable along the rods. As the arm 16, is half the length of the top and bottom bars 6 and 7 of the frame 5, it follows that when the end 19, of the arm 16, engages the side bar 9, of the frame 5, the upright 15, of the bracket 14, will be positioned approximately midway between the side bars.

The lower end of the upright 15, is formed with a lug or offset portion 21, in which is mounted a stud 22, and the upper end has an apertured ear 23, the aperture of which is in alinement with the stud 22. A short shaft 24, projects at its outer end through a slot 25, formed in the top bar 6, of the frame 5, and at its lower end projects through the apertured ear 23, previously mentioned.

Figure 5:
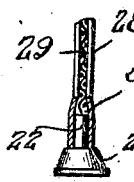
Figure 5 is a detail of the bottom pivot of the partition.

A rectangular partition 20, comprising top and bottom bars 26 and 27 and side bars 28, to which is attached a netting 29, is pivotally supported by means of the stud 22, and shaft 24. As best illustrated in Figure 5 the stud 22, projects loosely into a bearing 30, formed in the bottom bar 27, of the partition while the lower end 32, of the short shaft 24, which is of rectangular cross section slidably enters an opening 31, in enlargement 33, of the upper bar of the partition, any suitable means (not shown) being employed to prevent the shaft 24 from rotation in the opening 31.

The shaft 24, is formed with an enlargement 36, at its lower end formed with a depending lug 37, adapted to normally seat in notches 38, in the apertured ear 23, on the upright 15, of the bracket 14. A leaf spring 39, fixed to the arm 16, of the bracket 14, by means of a clip 40, normally forces the lugs 37, into the notches 38, when the partition is in closed or Figure 1 position.

When it is desired to move the partition to one side of the inclosure 10, the operator shifts the short shaft 24, by means of the milled head 41 until the lugs 37, are clear of the notches 38, whereupon the partition can be rotated about its vertical axis by a slight turn of the shaft 24. When the partition is moved to a position at right angles to the frame 5, the former can be slid to an out of the way position along the rods 11 and 12 against the side bar 8, of the frame 5. To move the partition to operative position it is merely necessary to reverse the operation just described.

While I have shown the body portion of the partition as being of reticulated construction it is obvious that it may be made of glass or other solid material. It will also be understood that the partition is adaptable for use in inclosures other than bird cages.

Having thus described my invention what I claim as new and desire to secure by Letters Patent is:

1. In a device of the kind described, a frame comprising top and bottom and side bars, the top bar having a slot therein, transversely disposed rods at the top and bottom of said frame, an inverted L-shaped bracket slidably mounted on said rods, the lower end of said bracket being formed with an offset portion having a stud mounted thereon, the upper end of the bracket formed with an apertured ear, the aperture of which is in alinement with said stud, a partition comprising top and bottom and side bars, the bottom bar of said partition having a bearing to loosely receive said stud and the top bar of said partition formed with an enlargement having an opening therein, a shaft extending through the slot in the top bar of the frame and through said apertured ear and engaging in the opening of said enlargement for rotating said partition.

2. In a device of the kind described, a frame, having a slot therein, transversely disposed rods secured to said frame, an inverted L-shaped bracket slidably mounted on said rods, said bracket formed with an apertured ear and a stud at opposite ends thereof, a partition having a bearing at one end adapted to receive said stud and also formed with an enlargement having an opening therein, a shaft extending through the said slot and through said apertured ear into the opening in said enlargement for rotating said partition, and spring actuated means for locking said partition against rotation.

In testimony whereof I affix my signature in presence of two witnesses.

ANDREW B. McBRIDE.

Witnesses:
WILLIS WALLINGFORD,
FRANK B. McGREGOR.